July 7, 1970   R. O. NEWMAN, JR   3,519,520
FIBER REINFORCED PLASTIC PIPE WINDING APPARATUS
Filed Dec. 21, 1967   2 Sheets-Sheet 1
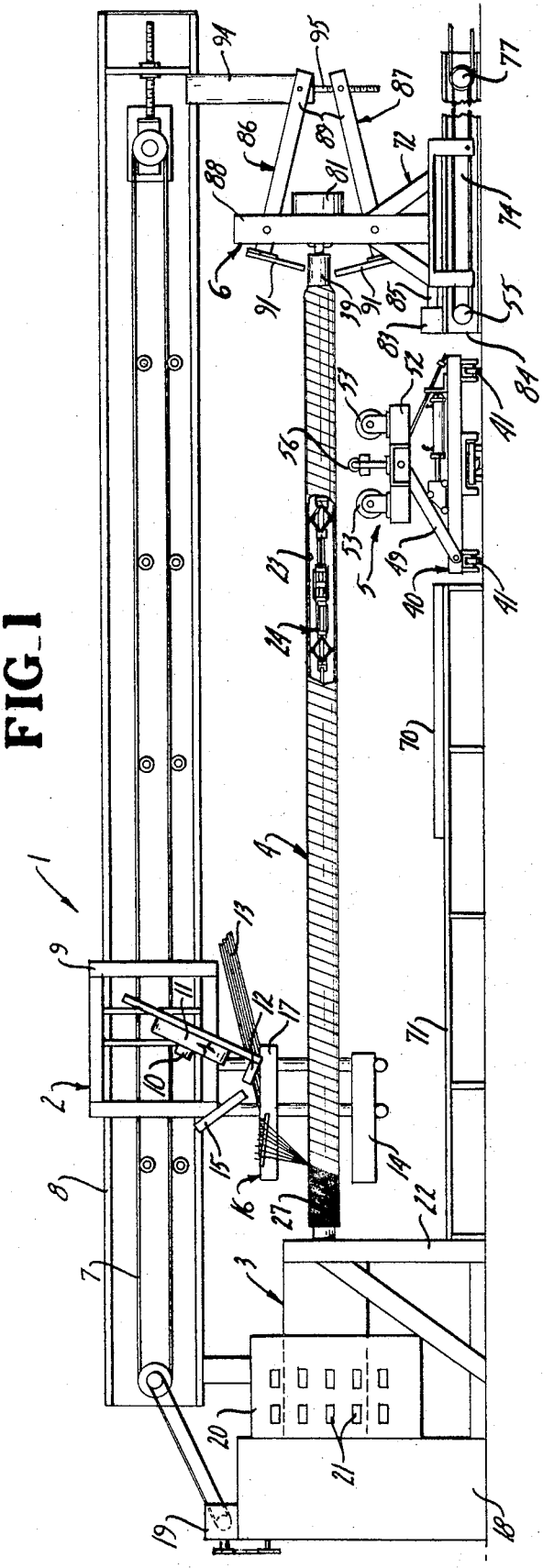
INVENTOR.
RITCHEY O. NEWMAN JR.
BY Howard J. Barnett
Attorneys July 7, 1970
R. O. NEWMAN, JR
3,519,520
FIBER REINFORCED PLASTIC PIPE WINDING APPARATUS
Filed Dec. 21, 1967
2 Sheets-Sheet 2
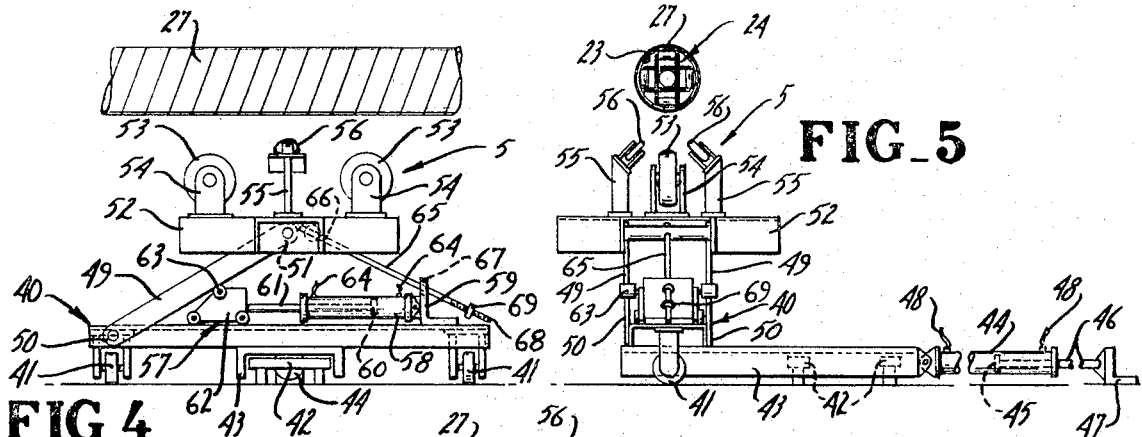
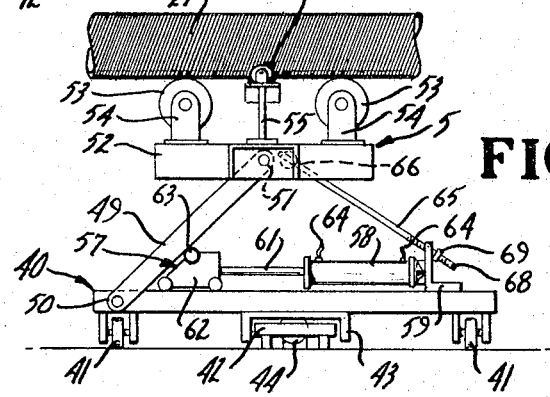
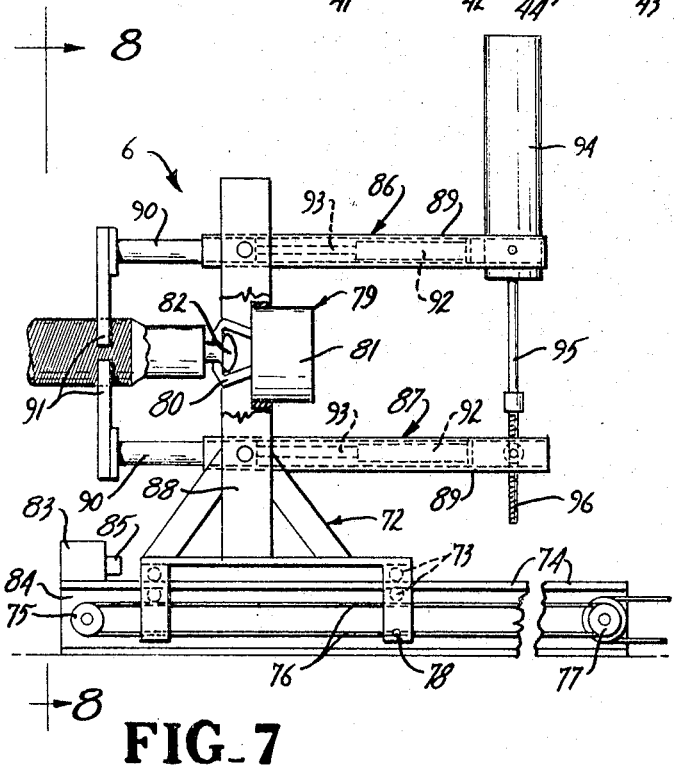
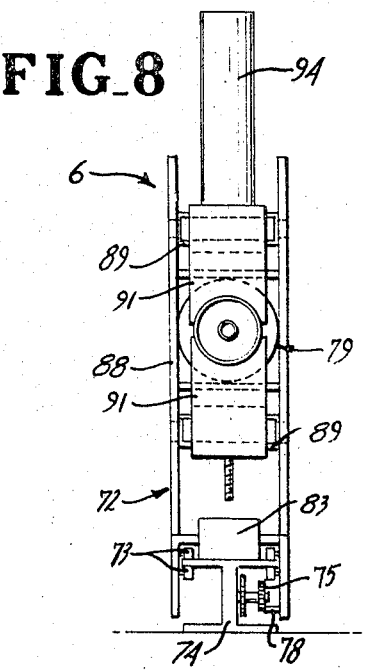
INVENTOR.
RITCHEY O. NEWMAN JR.
BY
Howard J. Barnett
Attorney United States Patent Office 3,519,520
Patented July 7, 1970

3,519,520
FIBER REINFORCED PLASTIC PIPE
WINDING APPARATUS
Ritchey O. Newman, Jr., Midland, Mich., assignor to
A. O. Smith Corporation, Milwaukee, Wis., a corporation of New York
Filed Dec. 21, 1967, Ser. No. 692,518
Int. Cl. B31c 1/08, 11/04, 11/06
U.S. Cl. 156—431                                14 Claims

ABSTRACT OF THE DISCLOSURE

A fiber reinforced plastic pipe winding apparatus which includes a steam curing assembly adapted for insertion in a pipe winding mandrel, a mandrel support mechanism which facilitates removal of the pipe from the end of the mandrel, and a tailstock-mandrel stripper mechanism for stripping the cured plastic pipe from the mandrel.

The apparatus is particularly adapted for the fabrication of fiber reinforced polyester resin plastic pipe utilizing a combination of woven glass tape and glass fibes impregnated with polyester resin and then steam cured. The apparatus may also be used for making fiber reinforced epoxy pipe, or any plastic pipe in which the close control of the process conditions is important.

---

In the manufacture of fiber reinforced plastic pipe, it is necessary to provide a form (mandrel) to give shape to the article. It is also necessary to provide means to cure the resin which is used to impregnate the fibrous filaments and tape-like mats, and which provides the rigid, noncorrosive, fluid-tight wall to the finished pipe. Various proposals have been made in the past to facilitate fiber reinforced pipe manufacture. For example, U.S. Pat. 3,202,560 describes the use of lightweight aluminum mandrels and successive handling steps in which a paraffin coated helical paper liner is first wrapped about the mandrel and coated with an overlying layer of resin which is cured by means such as a radiant heat lamp After the fiber reinforced pipe is wound over this base, the mandrel carrying the partially cured pipe is removed from the winding machine and placed on a curing table where additional radiant heat is applied to continue the resin curing process. The partially cured pipe is then disengaged from the mandrel, and saturated steam is passed through it to complete the curing and to melt the paraffin out of the interior.

In another apparatus described in U.S. Pat. 2,993,526, a meltable mandrel made of a metal having a relatively low melting point is proposed. The resin bearing tape is applied to this temporary mandrel, and the mandrel is subsequently melted and removed from the completed article. This apparatus also includes a separate curing chamber for curing the plastic pipe, and a steam system for remelting the temporary mandrel. The steam has no effect on the already cured pipe, but a special sleeve and passage is provided for returning the molten metal to a pump where it can be reused.

U.S. Pat. 3,159,515 discloses the fabrication of a composite oil container from metal foil and resin impregnated paper. The oil container cylinders are first fabricated as a long tubular member on a mandrel which contains a steam curing circulation system for the mandrel and a circulation system for circulating cooling water through the cured tubular member. In this apparatus, however, only a annular passage between the inner wall of the outer mandrel shell and the outside of an inner wall is provided for steam flow through the system. A separate annular cold water circulation system is provided between the inside surface, the inner shell and an axial, elongated shaft.

All of the above described systems are confronted with the problem of providing a mandrel support on which to wind a resin impregnated tape, curing means for causing the product to harden and set into a usable product and an adequate system for stripping the cured tubular member from the mandrel. Each of the devices described above is relatively complex and, in many cases, could not be utilized for the highly competitive fabrication of polyester or epoxy resin impregnated fiber reinforced pipe.

This invention is directed to a pipe winding apparatus which is relatively easy to operate, provides uniform flow of steam curing heat to all portions of the pipe, as well as subsequent flow of cooling water. The apparatus also includes a mandrel support device and mandrel stripper mechanism which cooperate to facilitate removal of a completed pipe section from the mandrel and initiation of a new fabrication cycle. The use of steam closely controls the curing temperature because the condensed steam prevents the temperature from rising above the revaporizing temperature, In one of the methods of plastic pipe manufacture utilizing the apparatus of the invention, the procedural steps are briefly as follows:

(1) A mold release agent is applied to the mandrel, while the mandrel is held under tension to prevent sagging;

(2) A polyester resin impregnated ribbon mat is applied spirally to the rotating mandrel;

(3) An overlay of polyester resin impregnated filament glass is applied to the rotating mandrel over the ribbon mat to form a plastic fiber reinforced pipe of the desired thickness;

(4) Steam is injected through the special steam curing assembly disposed axially in the mandrel to effect cure. The steam curing assembly is designed to regulate the steam pressure to obtain a constant and uniform curing rate throughout the pipe length within desired temperature limits;

(5) After the resin cure is completed, the steam is shut off, the mandrel is vented to drain off condensate, and cooling water is injected under pressure through the steam curing assembly, contracting the mandrel to cause separation from the cured pipe. When the apparatus is cool, the system is flushed out with air;

(6) The mandrel support mechanism is then actuated to move it into supporting relation with the pipe covered mandrel near its outer end. The outer tailstock end support of the mandrel is then disconnected, leaving the outer end of the mandrel fully supported by the mandrel support mechanism;

(7) The tailstock-mandrel stripper mechanism is then actuated to first extend a pair of pipe grabber jaws inwardly around the outer end of the mandrel. After the grabber jaws have been extended, they are closed together to engage the outer end of the cured pipe and strip it from the mandrel by an axial retracting motion, drawing the pipe from the end of the mandrel; and (8) The tailstock-mandrel stripper mechanism is then moved back into supporting engagement with the end of the mandrel, again placing the mandrel under tension, the mandrel support mechanism is retracted down and away from the mandrel and the apparatus is ready to commence a new manufacturing cycle.

The drawings furnished herewith illustrate a preferred construction of the present invention in which the above advantages and features are clearly disclosed.

In the drawings:

FIG. 1 is a side elevation of the overall apparatus of the invention with parts broken away showing the general relationship of the components of the pipe winding apparatus of the invention;

FIG. 2 is an enlarged detail of a portion of the mandrel shown in FIG. 1 with parts broken away to show the pipe curing apparatus of the invention;

FIG. 3 is a sectional view taken on line 3—3 of FIG. 2;

FIG. 4 is an enlarged side elevation of the mandrel support apparatus shown in FIG. 1, shown in the retracted position and showing a portion of the mandrel;

FIG. 5 is an enlarged end view with some parts broken away of the mandrel support apparatus shown in FIG. 4, with the mandrel, curing apparatus and pipe shown in section;

FIG. 6 is an enlarged side elevation of the apparatus shown in FIGS. 4 and 5 with parts broken away, showing the mandrel support apparatus in an extended position and showing a portion of the pipe covered mandrel;

FIG. 7 is an enlarged detailed side elevation with parts broken away showing the tailstock-stripping mechanism shown in FIG. 1, showing the grabber jaws in engagement with the pipe; and FIG. 8 is an end view of the apparatus shown in FIG. 7 taken on line 8—8 of FIG. 7 with the mandrel, curing apparatus and pipe shown in section.

As shown in the drawings, the pipe winding apparatus 1 generally comprises a winding head assembly 2, a headstock assembly 3, a mandrel assembly 4, a mandrel support assembly 5 and a tailstock-mandrel stripper assembly 6.

The winding head assembly 2 includes a chain drive 7 supported on an elongated carriage 8, which also supports the winding head support frame 9 for longitudinal movement of the winding head assembly 2 along the carriage 8. The winding head support frame carries a spool 10 of fiber tape 11. The tape 11 is fed to the mandrel assembly 4 through tensioning rolls 12. Tape 11 may be applied first directly on the mandrel assembly 4, and in several layers as desired. A separate source (not shown) of fiber strands 13 is also provided to the mandrel assembly 4 and may be applied in several successive layers to obtain the desired thickness.

The winding head assembly 2 may also include a drip pan 14 for receiving excess resin squeezed out from the tape 11 and the fiber strands 13. A resin dispensing nozzle 15 supplies resin to the tape 11 at the *inside* of the nip where it comes into contact with the mandrel assembly 4. A resin dip assembly 16 including a resin pan 17 is also provided for impregnating the fiber strands 13 with resin prior to guiding them onto the mandrel assembly 4. All of the above parts of the winding head assembly 2 are connected to it, and travel with it along the mandrel assembly 4.

The headstock assembly 3 comprises a gear box 18 which includes a drive assembly 19 for driving the chain drive 7, a control panel 20 for presetting the various hydraulic and automatic cycle controls 21, and a main mandrel headstock support frame 22. The headstock assembly 3 includes a rotatable drive means (not shown) for rotating the mandrel assembly 4 at a predetermined rate in coordination with the longitudinal rate of travel of the winding head assembly 2. Also not shown, but located directly behind the support frame 22, is a conventional rotary steam joint for connecting the headstock assembly 3 to the mandrel assembly 4.

The mandrel assembly 4 is normally rotatably supported between the headstock assembly 3 and the tailstock assembly 6. Included in the mandrel assembly 4 is a metal tubular mandrel 23, on which the tape 11 and the fiber strands 13 are laid, after first applying a suitable release agent to the outer surface by any suitable applicator means (not shown). Inside the mandrel 23 is the pipe curing apparatus 24. The pipe curing apparatus 24 includes a stinger 25 which is a tubular element extending the length of the mandrel and adapted to be successively connected to a source (not shown) of steam, water and air disposed in the headstock assembly 3 at predetermined times in the pipe manufacturing cycle. The stinger 25 is provided with outlets 26 which are spaced progressively closer together as the distance from the headstock end of the stinger 25, which receives steam during the curing cycle, increases. In this way, uniform heating (and cooling) of the mandrel 23 is assured, and thereby uniform curing of a plastic tubular member 27 wound on the mandrel 23 is assured.

For uniform cooling of the mandrel 23, it is also important that the stinger 25 be axially disposed in the mandrel 23. To accomplish this, a plurality of collapsible centralizing supports 28 are provided as shown in FIGS. 2 and 3. The supports 28 comprise four pairs of metal strips 29 having their respective inner ends pivotally connected to an annular set collar 30 mounted on the stinger 25. The outer ends of each pair of metal strips 29 rotatably support a roller 31. The strips 29 are pushed outwardly to cause the rollers 31 to engage inner wall 32 of the mandrel 23 by means of an open sided spacer 33, locked by means of a setscrew 34. The first (and last) centralizing support 28 to be inserted in the mandrel 23 can alternately be held in place by an annular collar 35 provided with a color setscrew 36.

The advantage of the above described stinger support system is that it is possible to assemble it through a relatively small diameter opening 37 in the end 38 of the mandrel 23. A drain outlet 38a is provided through opening 37 to drain the mandrel 23. It is also possible to remove the stinger 25 in the reverse manner of assembly so that the same stinger 25 can be used in more than one diameter mandrel 23. Successive supports 28 are disposed 90° relative to each other to provide uniform support to the stinger 25 throughout its length. This 90° rotation of the supports 28 is illustrated in FIG. 3 of the drawings. With the pipe curing apparatus 24, as described above, it is possible to commence the curing operation on thicker, large diameter pipe, even while the outer layers are simultaneously being wound. Also, when large diameter pipe is being wound, it is desirable to slant the mandrel 23 slightly from the horizontal to assure adequate water flow in a cascade effect.

After the winding head assembly 2 has repeatedly traversed the length of the mandrel 23, and the plastic tubular member 27 wound on the mandrel 23 has been cured and cooled as described generally above, the cured tubular member 27 must be removed from the mandrel 23. This is accomplished by the tailstock-mandrel stripper assembly 6, but before stripping can be done, it is necessary to support the tubular member 27 and the mandrel assembly 4 near the outer end 39 of the mandrel 23, at a distance of approximately one-fourth the overall mandrel length from the tailstock-mandrel stripper assembly 6.

As shown in FIGS. 4–6, the mandrel support assembly 5 is provided with a retractable carriage 40, mounted on rollers 41 which allows the mandrel support assembly 5 to be moved transversely of the mandrel 23 along guides 42, which guide a channel arm 43 secured to the underside of the carriage 40. Channel arm 43 is driven by an air cylinder 44, which acts against a piston 45, and piston rod 46 secured to a stationary bracket 47 to move the retractable carriage 40 towards or away from its mandrel supporting position. Transverse movement of the carriage 40 is determined by the relative air pressure supplied to the opposite sides of piston 45 by air lines 48 connected to a source of control air (not shown).

The mandrel support assembly 5 includes a pair of elevator bars 49 which are pivotally supported at their respective lower ends 50 on the carriage 40. The upper ends 51 of the elevator bars 49 are pivotally connected to a roller platform 52 which supports a pair of fixed, pneumatic casters 53, rotatably mounted on brackets 54. As best seen in FIG. 5, a pair of laterally adjustable brackets 55 support a pair of diagonally mounted rollers 56, which are adapted to contact the mandrel 23 on the opposite sides to cradle it on the support rollers 53. The distance between the diagonally mounted rollers 56 can be adjusted to accept different diameter mandrels 23.

The mandrel support assembly 5 is raised and lowered into position by means of an operating assembly 57 which includes an elevator air cylinder 58, secured to a movable mounting bracket 59 secured to the carriage 40. The bracket 59 can be moved to provide adjustment for different diameter mandrels 23. An elevator piston 60 is connected to a piston rod 61 which connects to a wedge-shaped pushing member 62, slidably supported on pushing member rollers 63. The pushing member rollers 63 push on the elevator bars 49 to raise the mandrel support assembly 5 into contact with the mandrel 23 in response to air pressure applied to the elevator piston 60 through air lines 64 from a source of control air (not shown). A height adjustment rod 65 is pivotally connected at its upper end 66 to the roller platform 52, and extends diagonally downwardly through an opening 67 in the mounting bracket 59. The outer end 68 of rod 65 threadedly receives an adjustable stop nut 69 which limits the upward movement of the roller platform 52 to a predetermined height, providing fine adjustment for the retractable carriage 40.

The retractable carriage 40 is lowered by reversing the motion of pushing member 62, and it is withdrawn transversely from under the mandrel 23 to provide space for a slidable resin drip pan 70 which is supported on a stationary resin drip pan 71. The stationary drip pan 71, in cooperation with the slidable resin drip pan 70, extends the length of the mandrel 23 during winding operations to catch excess resin. When the mandrel support assembly 5 is in use, the slidable resin drip pan 70 is moved coaxially of the mandrel 23 toward the headstock assembly 3 to permit the mandrel support assembly 5 to move in under the mandrel 23 during the mandrel stripping operation.

The tailstock-mandrel stripper assembly 6 is shown in FIGS. 7 and 8, as well as in the general view of FIG. 1. The assembly 6 is mounted on a carriage frame 72, which rides on rollers 73 on a long track 74. An idler chain sprocket 75 is rotatably mounted on the inner end of the track 74 and is provided with a chain drive 76 which is connected to a drive sprocket 77 at the far end of the track 74 and is driven by any suitable drive means, such as an electric motor (not shown). The chain drive 76 is connected to the lower part of the carriage frame 72 by a connecting link 78. The track 74 extends coaxially outwardly from the mandrel 23 and is of a length to allow complete removal of the cured plastic tubular member 27 from the end of the mandrel assembly 4.

The tailstock-mandrel stripper assembly 6 is provided with a releasable gripping mechanism 79 of any conventional type having gripping jaws 80 mounted in a rotatable bearing 81 and actuated by a control means (not shown) to releasably grip knob-like end 82 of the mandrel 23.

A tensioning air cylinder assembly 83 is disposed on inner end 84 of the track 74, and includes a pusher rod 85, which is urged against the carriage frame 72 during winding to prevent mandrel sag. The pusher rod 85 compensates both for expansion and contraction of the mandrel 23 as it is alternately heated and cooled, thereby maintaining a constant tension to keep the mandrel 23 straight. This is especially important when the tubular member 27 is becoming rigid during curing.

A pair of extendable grabber jaw assemblies 86 and 87 are pivotally connected to an upstanding frame element 88 of the carriage frame 72. Each grabber jaw assembly includes a pivotal, channel-shaped arm 89 which slidably supports an extendable arm 90 on which is mounted a grabber jaw 91. The extendable arms 90 are extended and retracted by means of similar air cylinder assemblies 92 having similar piston rods 93 connected to their respective extendable arms 90. The arms 90 are actuated together and when extended, a large air cylinder assembly 94, mounted on the arm 86, can be actuated to drive a long piston rod 95 to pivot the grabber into, and out of, engagement with the tubular member 27. The piston rod 95 is connected to the lower arm 87 through an adjusting rod 96 to adjust the grabber jaws 91 to the desired gripping position. It is contemplated that various configurations of grabber jaws 91 can be utilized, depending on the diameter of the tubular member 27 being fabricated.

In operation, the air cylinder assemblies 92 of the grabber jaw assembly 86 are actuated to extend the arms 90 after the tensioning cylinder assembly pusher rod 85 has been retracted, and the gripping jaws 80 of mandrel releasable gripping mechanism 79 have been opened, and the outer end 39 of mandrel 23 and tubular member 27 is supported solely by the mandrel support assembly 5. The large air cylinder assembly 94 has pivoted the arms 89 to the position shown in FIG. 1, and is now actuated to pivot the grabber jaws 87 into firm engagement with the outer end of the tubular member 27. The chain drive 76 is then actuated to drive the carriage frame 72 outwardly, thereby pulling the tubular member 27 axially off the outer free end 39 of the mandrel 23. When the carriage frame 72 reaches the outer end of the track 74, the grabber jaws 91 are opened, releasing the completed tubular member 27. A plurality of "swinging gate" roller asemblies (not shown) may be provided to receive the completed tubular member 27 when it is released by the tailstock-mandrel stripper assembly 6. The roller assemblies are slanted to cause the tubular member to roll down and away from the return path of the tailstock-mandrel stripper assembly 6. When the tailstock-mandrel stripper assembly 6 is moving in either direction, the roller assemblies are swung out of the way by suitable controls (not shown). The chain drive 76 is reversed, returning the carriage frame 72 and the tailstock-mandrel stripper assembly 6 to the initial position where the gripping jaws 80 re-engage the knob-like end 82 of the mandrel, and the pusher rod 85 is then urged against the carriage frame 72 to again place the mandrel 23 under tension in readiness for successive winding operations. The mandrel support assembly 5 is then retracted and the slidable resin drip pan 70 is moved back in place prior to commencing the next fabrication cycle.

Applicant's apparatus provides an adaptable system for the fabrication of fiber reinforced plastic pipe. The system is easily changed to fabricate pipe of different diameters. The internal curing system is relatively simple and provides critical fast and uniform heating with close temperature control, and subsequent uniform and rapid cooling of the mandrel to improve production rates attainable. In actual tests, curing times for typical polyester pipe were reduced to ⅙–⅒ of the cure times required using conventional curing apparatus. No separate oven curing is required, and it is contemplated that a plurality of mandrels could be mounted in parallel to utilize the same winding assembly in succession. In addition, it is contemplated that winding, curing and cooling of a plurality of tubular members 27 on a plurality of mandrels 23 could be carried on simultaneously to further increase production volumes attainable.

The mandrel stripping system, including the mandrel support asembly provides a rapid means for ready removal of completed, cured tubular members from the mandrel, and for returning the apparatus to a condition of readiness for successive winding operations.

Various modes of carrying out the invention are contemplated as being within the scope of the following claims particularly pointing out and distinctly claiming the subject matter which is regarded as the invention.

I claim:

1. In a fiber reinforced plastic tubular member winding apparatus which includes a travelling winding head, a rotatably supported tubular mandrel having a headstock end including drive means for rotating said mandrel and having a tailstock end, said mandrel being adapted to receive fibrous reinforcing material impregnated with an uncured resin to form a tubular member thereon, the combination of a longitudinally extending fluid distributing conduit disposed concentrically in said tubular mandrel, said fluid distributing conduit being adapted for successive connection to sources of steam and cooling water to first cure and then cool a tubular member wound on said mandrel, a mandrel support assembly disposed adjacent the tailstock end of said mandrel, means for moving said mandrel support assembly into and out of supporting engagement with said mandrel, and a detachable tailstock-mandrel stripper assembly for rotatably supporting said mandrel, said tailstock-stripper assembly including a grabbing mechanism for engaging and gripping the adjacent end of a cured fiber reinforced plastic tubular member disposed on said mandrel and removing said tubular member from the end of said mandrel.

2. The apparatus of claim 1, in which the tailstock-mandrel stripper assembly includes a movable carriage supporting a retractable gripping device rotatably supporting the tailstock end of said mandrel during fabrication of a tubular member, means to disengage said gripping device from said mandrel when said mandrel support assembly is in supporting engagement with the mandrel, means to move said grabbing mechanism into engagement with the adjacent end of a cured fiber reinforced plastic tubular member after said gripping device is disengaged from the mandrel whereby said movable carriage is free to move axially away from the mandrel to remove said tubular member from the end of said mandrel.

3. The apparatus of claim 1, in which the grabbing mechanism includes a pair of pivotal arms each having a first end extending towards the tailstock end of said mandrel, a pair of grabber jaws attached one each to the respective first ends of said pivotal arms, said grabber jaws being co-operable to engage and grip the end of the cured fiber reinforced plastic tubular member and to remove said tubular member axially from said mandrel.

4. The apparatus of claim 3, in which the pivotal arms each include extensible end members slidably disposed on the respective first ends thereof, one each of said pair of grabber jaws being secured to the respective ends of said extensible end members.

5. The apparatus of claim 2, including a drive system operably connected to said movable carriage to move said movable carriage axially away from said mandrel a sufficient distance to completely remove said tubular member from the tailstock end of said mandrel.

6. The apparatus of claim 2, including tensioning means for urging said movable carriage away from the mandrel when the gripping device is engaged with the tailstock end of the mandrel, whereby said mandrel is prevented from sagging during winding and curing of said tubular member.

7. The apparatus of claim 1, in which the mandrel support assembly is vertically movable, and includes adjustable means for receiving and supporting different diameter mandrels thereon.

8. The apparatus of claim 1, in which the mandrel support assembly includes at least one main supporting roller to engage and support the underside of said mandrel and tubular member, and a pair of diagonally disposed, laterally adjustable side rollers, all of said rollers being adapted to initially engage said tubular member during removal of said tubular member from said mandrel, and to subsequently engage and support the tailstock end of said mandrel while said tailstock-mandrel stripper assembly is disengaged from supporting relationship with said mandrel.

9. The apparatus of claim 8, including a drive means for moving said mandrel support assembly laterally towards and away from the mandrel.

10. The apparatus of claim 1, in which the fluid distributing conduit includes an inlet at the headstock end of said tubular mandrel, said conduit having a plurality of fluid distributing openings along the length thereof, said openings being spaced progressively closer in the direction away from said inlet to provide uniform distribution of heat transfer fluid to said tubular mandrel throughout the length of said fluid distributing conduit.

11. The apparatus of claim 1, including collapsible support means for supporting said longitudinally extending conduit concentrically in said mandrel.

12. The apparatus of claim 1, including an annular return conduit for heat transfer fluid defined by the inner wall of said tubular mandrel and the outer surface of said fluid distributing conduit, and an outlet at the headstock end of said mandrel for said heat transfer fluid.

13. The apparatus of claim 12, including means to successively supply steam and water to said mandrel through said fluid distributing conduit to first steam cure a fiber reinforced plastic tubular member disposed on said tubular mandrel, and then water cool said mandrel to contract said mandrel away from the cured tubular member prior to removal of said tubular member from said mandrel by means of said grabbing mechanism.

14. The apparatus of claim 13, including means to supply air through said fluid distributing conduit after the mandrel has been cooled to flush said cooling water from said mandrel.

References Cited

UNITED STATES PATENTS

| | | |
|---|---|---|
| 2,993,526 | 7/1961 | Young. |
| 3,038,832 | 6/1962 | Carlson et al. |
| 3,128,216 | 4/1964 | Reed. |
| 3,378,427 | 4/1968 | McClean. |
| 3,446,689 | 5/1969 | Van Leeuwen et al. |

BENJAMIN A. BORCHELT, Primary Examiner

T. H. WEBB, Assistant Examiner

U.S. Cl. X.R.

156—173, 176, 287